United States Patent [19]
Renner et al.
[11] 3,924,707
[45] Dec. 9, 1975

[54] SAFETY INSTRUMENT PANEL FOR MOTOR VEHICLES

[75] Inventors: Hermann Renner, Magstadt; Béla Barényi, Maichingen, both of Germany

[73] Assignee: Daimler-Benz Aktiengesellschaft, Germany

[22] Filed: Dec. 7, 1973

[21] Appl. No.: 422,680

[30] Foreign Application Priority Data

Dec. 7, 1972 Germany ............ 2259906

[52] U.S. Cl. ............ 180/90; 280/150 B
[51] Int. Cl.² ............ B60K 35/00
[58] Field of Search ....... 280/150 B; 180/90; 296/70

[56] References Cited

UNITED STATES PATENTS

| | | | |
|---|---|---|---|
| 3,373,629 | 3/1968 | Wight | 280/87 R |
| 3,412,628 | 11/1968 | De Gain | 293/70 |
| 3,492,888 | 2/1970 | Nishimura | 280/87 R X |
| 3,498,402 | 3/1970 | Barenyi | 180/90 |
| 3,599,757 | 8/1971 | Takamatsu | 293/70 X |
| 3,774,713 | 11/1973 | Stegmaier | 180/90 |
| 3,776,359 | 12/1973 | Breitschwerdt | 180/90 |

*Primary Examiner*—Kenneth H. Betts
*Attorney, Agent, or Firm*—Craig & Antonelli

[57] ABSTRACT

A safety instrument panel for motor vehicles which is constructed form-rigid and is so arranged in relation to relatively fixed vehicle parts surrounding the same that a gap exists on all sides; the supporting connection of the instrument panel with the relatively fixed vehicle part thereby takes place exclusively by way of energy-absorbing means.

10 Claims, 7 Drawing Figures

8
10
9
1
7

8
10
9
9
2
1
7

8
10
9
9
2
1
7

SAFETY INSTRUMENT PANEL FOR MOTOR VEHICLES

The present invention relates to a safety instrument panel for motor vehicles.

It is already known for some time that during an impact of vehicle passengers on an instrument panel which is not constructed properly as regards safety, considerable injuries may be caused whereas, on the other hand, instrument panels constructed properly as regards safety can contribute quite considerably to the protection of the vehicle passengers. It has therefore been already proposed on numerous occasions to cover the instrument panels of motor vehicles with a padding layer which is as thick as possible or to construct the instrument panel yieldingly. However, it is generally not possible by such types of measures to create a sufficiently large deformation path for an impinging person so that a sufficient energy absorption cannot take place and injuries cannot be avoided with sufficient certainty.

The present invention is therefore concerned with the task to avoid these disadvantages of prior art instrument panels and to provide an instrument panel which enables to a person impinging during an accident a far-reaching energy absorption.

The underlying problems are solved according to the present invention in that the instrument panel is constructed inherently form-rigid and is arranged on all sides thereof with a gap with respect to the relatively fixed vehicle parts and in that the supporting connection with the relatively fixed vehicle parts takes place exclusively by energy-absorbing means. It is achieved thereby that the instrument panel itself does not have to be used for purposes of energy adsorption which has proved as particularly disadvantageous by reason of the formation of dangerous sharp-edged folds and buckles which occur thereby.

Extremely long deformation paths can be realized without difficulty by the arrangement according to the present invention of an instrument panel—for example, the instrument panel may be set back up to in proximity of the chest of the passenger seated alongside the driver—and the force required for the deformation of the energy-absorbing means can be freely selected within wide limits.

A particularly simple embodiment of the present invention which can be realized in a particularly economical manner resides in that deformation members consisting of sheet metal are provided as energy-absorbing means which are preferably constructed as impact pots with undulated walls.

According to a preferred embodiment of the present invention, the support of the proposed safety instrument panel takes place only by way of two deformation members whereby the distance from the center axes thereof is at least as large as the distance from the center of the driver seat to the center of the co-driver seat or passenger seated alongside the driver.

Particularly good assembly and repair possibilities exist if the deformation members are secured readily detachable at relatively fixed vehicle parts and/or at the instrument panel.

Accordingly, it is an object of the present invention to provide a safety instrument panel for motor vehicles which avoids by simple means the aforementioned shortcomings and drawbacks encountered in the prior art.

Another object of the present invention resides in a safety instrument panel for motor vehicles which enables sufficiently large deformation paths for impinging persons to ensure a sufficient energy absorption and thereby to avoid injuries with reasonable certainty.

A further object of the present invention resides in a safety instrument panel which enables a far-reaching energy absorption in case of accidents causing the vehicle passengers to be thrown forwardly.

Still another object of the present invention resides in an instrument panel which is not utilized itself for purposes of energy absorption, thereby avoiding the formation of dangerous sharp-edged folds and buckles which would otherwise be caused as a result of the deformation of the instrument panel itself.

A further object of the present invention resides in an instrument panel in which the force necessary for the deformation of the energy-absorbing means can be selected freely within relatively wide limits.

Still a further object of the present invention resides in a safety instrument panel which is characterized by simplicity and low cost of manufacture as well as good assembly and repair possibilities.

These and other objects, features and advantages of the present invention will become more apparent from the following description when taken in connection with the accompanying drawing which shows, for purposes of illustration only, several embodiments in accordance with the present invention, and wherein.

Figure 3:
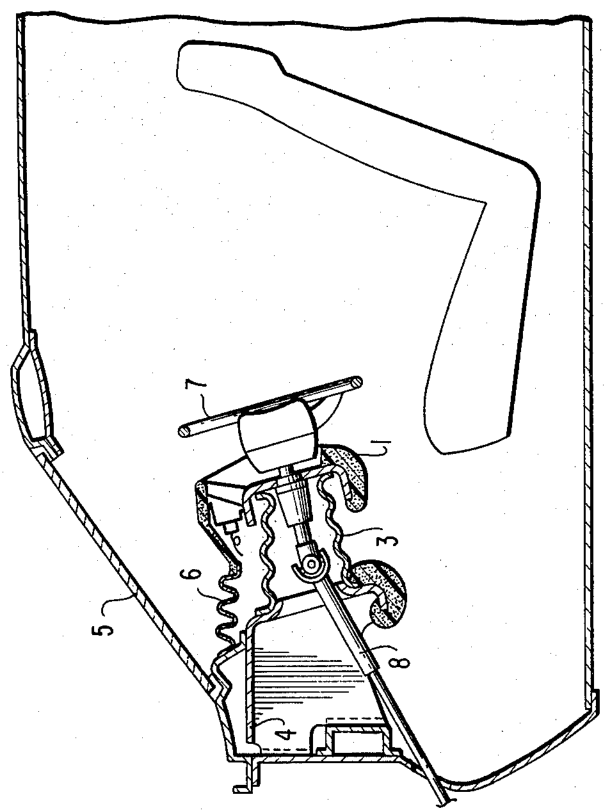
FIG. 3 is a cross-sectional view taken along line III—III of FIG. 2.
Figure 4:
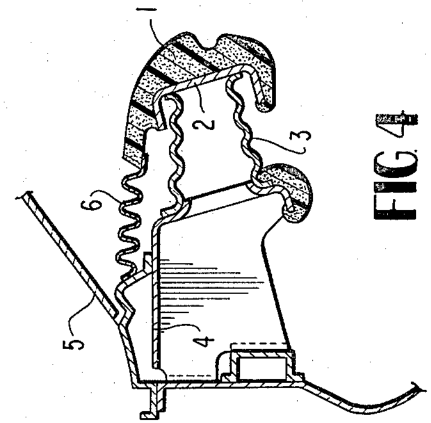
FIG. 4 is a cross-sectional view taken along line IV—IV of FIG. 2.
Figure 1:
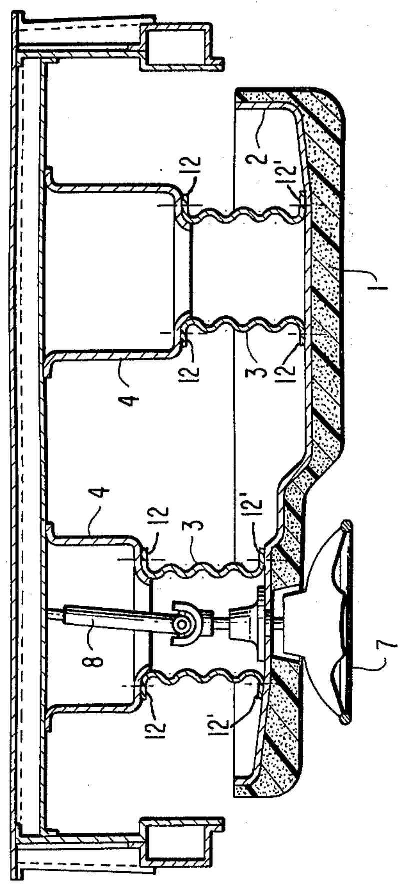
FIG. 1 is a cross-sectional view, taken from above, through an instrument panel constructed according to the present invention which is supported at relatively fixed vehicle parts by way of two deformation members having undulated walls.
Figure 2:
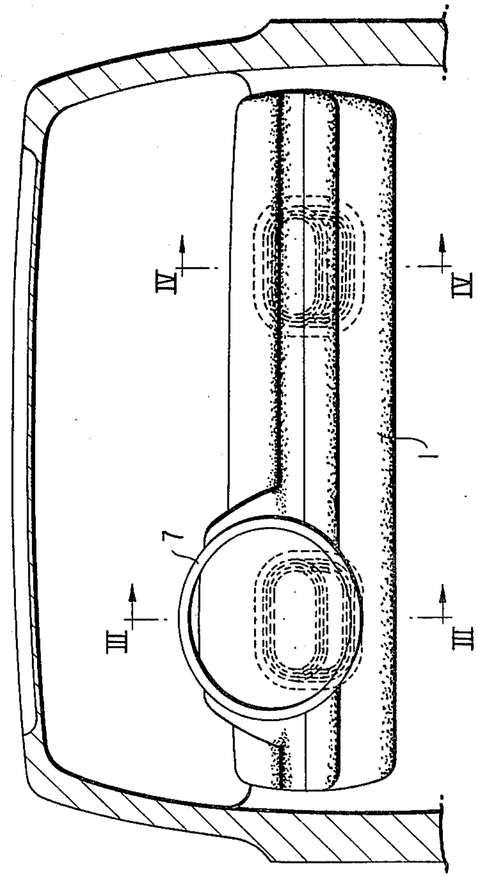
FIG. 2 is a front elevational view of the instrument panel of FIG. 1.

Referring now to the drawing wherein like reference numerals are used throughout the various views to designate like parts, and more particularly to FIGS. 1 to 4, an instrument panel 2 constructed beam-shaped or girder-shaped and provided with a padding 1 consisting, for example, of conventional foamed plastic material is illustrated in these figures. The instrument panel 2 is so connected with fixed vehicle parts 4 by way of two impact pots 3 having undulated walls that gaps remain on all sides between the instrument panel 2 and the fixed parts of the vehicle whereby these gaps or free spaces enable an unimpaired displacement of the instrument panel 2 during deformation of the impact pots 3. The impact pots 3 may be detachably secured to the fixed vehicle parts 4, as well as the instrument panel 2, through the flanges 12, 12' by any removable securing means. As can be seen from FIGS. 3 and 4, the gap provided on the top side of the instrument panel 2 between its padding 1 and the fixed vehicle parts disposed below the windshield pane 5 can be covered off by an undulated sheet metal member 6 which not only does not impair a displacement of the instrument panel 2 during an impact of a vehicle passenger but may even contribute to the energy absorption.

The steering wheel is supported in the illustrated embodiment of the present invention at the instrument panel 2 and is connected with a multi-partite jointed steering spindle 8 changeable in its length by telescoping action of its parts, whence the steering wheel 8 also cannot impair a displacement of the instrument panel 2.

Figure 5:
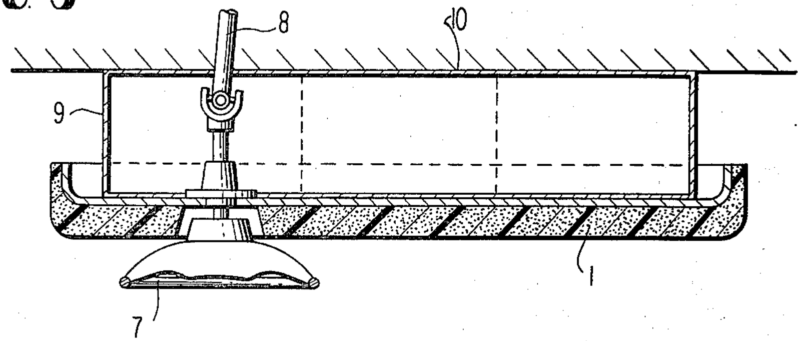
FIGS. 5 to 7 are schematic top plan views, similar to FIG. 1, on three different embodiments of instrument panels in accordance with the present invention which are supported at relatively fixed vehicle parts in different ways.
Figure 6:
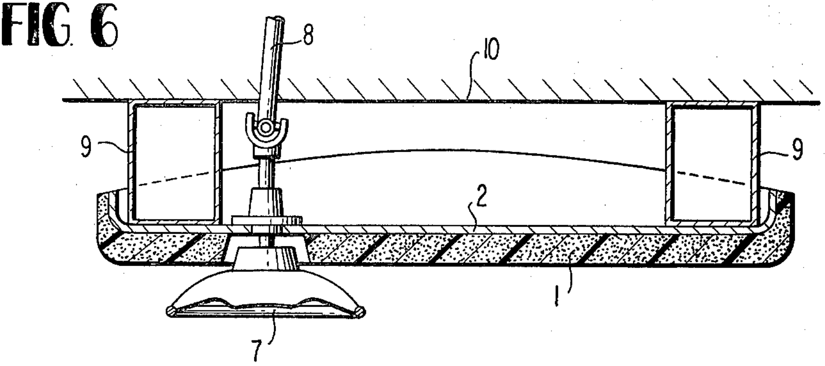
Figure 7:
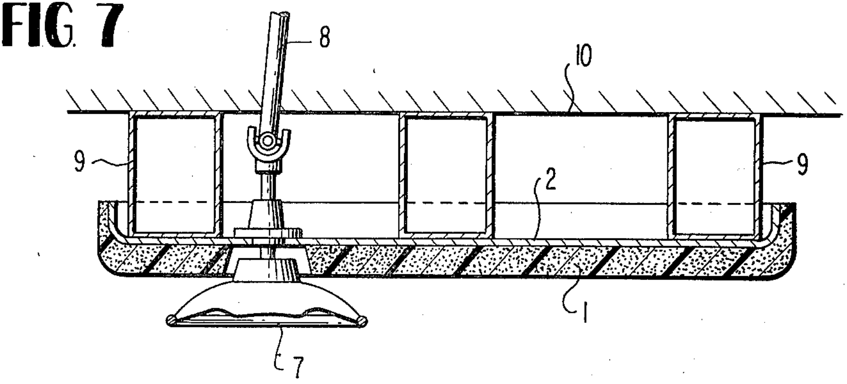

In the embodiments of the present invention illustrated in FIGS. 5 to 7, instrument panels 2 provided with a padding 1 are also illustrated which are supported at relatively fixed vehicle parts 10 by way of deformation members 9 consisting of sheet metal and constructed in various ways.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A safety instrument panel for motor vehicles, characterized in that the instrument panel is constructed substantially form-rigid and is arranged with a gap with respect to relatively fixed vehicle parts on all sides thereof, and in that the instrument panel is connected with said relatively fixed vehicle parts substantially exclusively by way of energy-absorbing means, said energy-absorbing means being deformation members constructed as impact pots with undulated walls such that a long deformation path of said energy-absorbing means occurs on impact avoiding deformation of the instrument panel, and further characterized in that the gap provided at the top side of the instrument panel and the fixed vehicle parts is covered off by an undulated sheet metal member.

2. A safety instrument panel according to claim 1, characterized in that the deformation members consist of sheet metal.

3. A safety instrument panel according to claim 2, characterized in that the support of the instrument panel takes place only by way of two deformation members and in that the distance of the center axes thereof is at least as large as the distance from the center of the driver seat to the center of the co-driver seat.

4. A safety instrument panel according to claim 3, characterized in that the deformation members are secured readily detachably at least at one of the two parts consisting of the relatively fixed vehicle parts and of the instrument panel.

5. A safety instrument panel according to claim 4, characterized in that the deformation members are readily detachably secured at the relatively fixed vehicle parts and at the instrument panel.

6. A safety instrument panel according to claim 1, characterized in that the support of the instrument panel takes place only by way of two deformation members and in that the distance of the center axes thereof is at least as large as the distance from the center of the driver seat to the center of the co-driver seat.

7. A safety instrument panel according to claim 1, characterized in that the deformation members are secured readily detachably at least at one of the two parts consisting of the relatively fixed vehicle parts and of the instrument panel.

8. A safety instrument panel according to claim 7, characterized in that the deformation members are readily detachably secured at the relatively fixed vehicle parts and at the instrument panel.

9. A safety instrument panel according to claim 1, characterized in that the instrument panel extends transversely in the vehicle interior in front of both the driver seat and the co-driver seat.

10. A safety instrument panel according to claim 1, characterized in that the steering wheel is supported at the instrument panel and is connected with a multi-partite jointed steering spindle changeable in its length by telescoping action of its parts.

* * * * *